United States Patent [19]

Szczutkowski

[11] Patent Number: 5,051,991
[45] Date of Patent: Sep. 24, 1991

[54] METHOD AND APPARATUS FOR EFFICIENT DIGITAL TIME DELAY COMPENSATION IN COMPRESSED BANDWIDTH SIGNAL PROCESSING

[75] Inventor: Craig F. Szczutkowski, Forest, Va.

[73] Assignee: Ericsson GE Mobile Communications Inc., Lynchburg, Va.

[21] Appl. No.: 661,740

[22] Filed: Oct. 17, 1984

[51] Int. Cl.$^5$ .............................. H04J 3/06; H04B 1/66
[52] U.S. Cl. .................................... 370/108; 370/109; 375/122; 381/33
[58] Field of Search ............ 370/109, 185, 108, 110.1, 370/118; 381/29-35; 375/122; 358/133, 260; 333/14

[56] References Cited

U.S. PATENT DOCUMENTS

| 3,697,682 | 10/1972 | Berg | 358/133 |
|---|---|---|---|
| 4,027,243 | 5/1977 | Stackhouse et al. | |
| 4,174,465 | 11/1979 | Meares et al. | 370/109 |
| 4,300,161 | 11/1984 | Haskell | 370/109 |
| 4,345,325 | 8/1982 | Gandini et al | 370/108 |
| 4,375,581 | 3/1983 | Jayant | 375/122 |
| 4,382,160 | 5/1983 | Gosling et al. | 381/31 |
| 4,382,298 | 5/1983 | Evans . | |
| 4,455,649 | 6/1984 | Esteban et al. | 370/118 |
| 4,477,900 | 10/1984 | Gruenberg | 370/118 |
| 4,513,427 | 4/1985 | Borriello et al. | 370/108 |
| 4,519,073 | 5/1985 | Bertocci et al. | 370/109 |
| 4,546,342 | 10/1985 | Weaver et al. | 375/122 |
| 4,569,075 | 2/1986 | Nussbaumer | 381/29 |
| 4,581,638 | 4/1986 | Chiariglione et al. | 358/133 |
| 4,586,088 | 4/1986 | Kondo | 358/260 |
| 4,622,680 | 11/1986 | Zinser | 370/118 |
| 4,646,148 | 2/1987 | Lienard et al. | 375/122 |

OTHER PUBLICATIONS

Crochiere, R. E., Webber, S. A. and Flanagan, J. L., "Digital Coding of Speech in Subbands", Bell Syst. Tech. J., 55 (Oct. 1076), 1069-1085.
Crochiere, R. E., "On the Design of Sub-Bands Coders for Low-Bit-Rate Speech Communication", Bell Syst. Tech. J., 56 (May-June 1977), 747-770.
Crochiere, R. E., "Digital Signal Processor-Sub-Band Coding", Bell Syst. Tech. J. 60 (Sep. 1981), 1633-1653.
Esteban, D. and Galand, C., "Application of Quadrature Mirror Filters to Split Band Voice Coding Schemes", Proc. 1977 Int. Conf. on Acoustics, Speech and Signal Processing, Hartford, CT. (May 1977) 191-195.
Cummiskey, P., Jayant, N. S. and Flanagan, J. L., "Adaptive Quantization in Differential PCM Coding of Speech", Bell Syst. Tech. J., 52 (Sep. 1973) 1105-1118.
Goodman, D. J. and Wilkinson, R. M., "A Robust Adaptive Quantizer", IEEE Trans. Comm., COM-23 (Nov. 1975), 1362-1365.
Croisier, A., "Progress in PCM and Delta Modulation: Block Companded Coding of Speech Signals", 1974 Int. Zurich Seminar, Proceedings.

(List continued on next page.)

Primary Examiner—Curtis A. Kuntz
Attorney, Agent, or Firm—Nixon & Vanderhye

[57] ABSTRACT

Time delay compensation is inserted into a digital signal processing channel having compressed bandwidth portions at a point where the bandwidth is compressed. Since a smaller number of bits per unit of information is present at such a point, this reduces the number of bits which must be buffered to achieve a given amount of time delay compensation. For example, in a subband coder/decoder using a non-symmetrical QMF filter tree, the necessary time delay compensation in the various subband channels is effected subsequent to a digital bandwidth compression encoding step on the transmitter side. on the receiver side, similar time compensation may be provided in the subband channels prior to a digital bandwidth expansion decoding step. By implementing the necessary digital time delay compensation at a point in the system where the signals are bandwidth compressd to a maximum degree (i.e. using a minimum number of bits per second to transmit given information), digital memory requirements for implementing the digital time delay compensation are minimized.

13 Claims, 4 Drawing Sheets

OTHER PUBLICATIONS

Jonston, J. D., "A Filter Family Designed for Use in Quadrature Mirror Filter Banks" Proceedings 1980 Int. Conf. on Acoustics Speech and Signal Processing, Denver, CO, Apr. 1977, pp. 291-294.

Max J., "Quantizing for Minimum Distortion", IRE Trans. Information Theory, IT-6 (Mar. 1960), 7-12.

Jakes, W. C., "Microwave Mobile Communications", J. Wiley and Sons, New York, (1974).

Boddie, J. R., et al. "Adaptive Differential Pulse-Code-Modulation Coding", The Bell System Technical Journal, vol. 60, No. 7, Sep. 1981, pp. 1547-1561.

Crochiere, R. E., et al., "A 9.6 Kb/s DSP Speech Coder", The Bell System Technical Journal, vol. 61, No. 9, Nov. 1982, pp. 2263-2288.

Smith M. J. T., et al. "A Procedure for Designing Exact Reconstruction Filter Banks for Tree-Structured Subband Coders", Proceedings of the IEEE International Conference on Acoustics, Speech and Signal Processing, Mar. 1984, vol. 2, pp. 27.1.1-27.1.4.

Barnwell, T. P., et al., "A Real Time Speech Subband Coder Using the TMS32010".

Fjallbrant, T., et al., "A Speech Signal ATC-System with Short Primary Blocklengths and Microprocessor-Based Implementation", . . . , pp. 357-363.

Zinser, Richard L.; Silverstein, Seth D.; Anderson, John B. "A Robust 9.6Kb/s Subband Coder Design for the Rayleigh Fading Channel", Proceedings of IEEE International Conference on Comm. pp. 1163-1168, May 1980, vol. 3.

METHOD AND APPARATUS FOR EFFICIENT DIGITAL TIME DELAY COMPENSATION IN COMPRESSED BANDWIDTH SIGNAL PROCESSING

This invention relates generally to the field of electrical signal coding/decoding for transmission of digital signals over communication channels. More particularly, it relates to an improved method and apparatus for efficiently implementing required digital time delay compensation in conjunction with bandwidth compressed digital signal processing channels. It finds especially useful application in conjunction with non-symmetrical QMF filter trees typically utilized in subband signal processing.

This application is related to the following commonly assigned copending applications:

Ser. No. 661,597 now U.S. Pat. No. 4,817,146 entitled "Cryptographic Digital Signal Transceiver Method and Apparatus" by Szczutkowski et al, filed concurrently herewith;

Ser. No. 661,598 now U.S. Pat. No. 4,622,680 entitled "Hybrid Subband Coder/Decoder Method And Apparatus" by Zinser, filed concurrently herewith; and Ser. No. 661,733 now U.S. Pat. No. 4,757,536 entitled "Method and Apparatus For Transceiving Cryptographically Encoded Digital Data" over a radio communication channel by Szczutkowski et al, filed concurrently herewith.

The disclosure of these related applications is hereby expressly incorporated by reference. Although not required to practice the invention claimed in the present application, the presently preferred exemplary embodiment does utilize these related inventions as will be explained below.

Subband coders using non-symmetrical quadrature mirror filter (QMF) filter trees are well known in the art. For example, such a QMF filter tree used for separating digitized speech signals into four octave bands (and an inverse QMF tree for combining them back into one band at the receiver) in the context of a subband encoding/decoding technique is discussed in "A Robust 9.6 Kb/s Subband Coder Design for the Rayleigh Fading Channel" by Zinser, Silverstein and Anderson, Proceedings of the IEEE International Conference on Communications, May 1984, Volume 3, pages 1163-1168. A collection of prior art publications generally relevant to subband coder design is contained in this paper which is hereby expressly incorporated by reference.

As is well known in the art, non-symmetrical QMF filter trees are well suited for efficiently dividing a digitized input signal into subband channels of digital signals representing different frequency subbands of signal components. Such a QMF filter tree is particular advantageous where programmed digital signal processors are employed to physically implement the signal processing algorithms.

It is also well known that because of the non-symmetrical tree structure of such a QMF filter bank, the various bands have different numbers of filter elements therewithin thus causing different filtering process times to be involved in the different subband channels. It is conventional practice to include compensating time delay in the various subband channels so as to keep the digital signals representing the different frequency components travelling in approximate time synchronism throughout the system. A formula for calculating the required magnitude of time delay compensation in each channel is expressly given in the above-referenced Zinser et al paper.

However, in prior art subband coded signal processing, such time delay compensation has been conventionally effected as a part of or immediately adjacent the QMF filtering function itself. When thus closely associated with the QMF filter tree, the digital memory required for time delay compensation can be rather large due to the relatively high bit rates involved.

Now, however, I have discovered that one may successfully perform the required time delay compensation upon bandwidth compressed encoded digital signals in the subband channels thereby greatly reducing the required memory for implementing such time delay compensation.

For example, on the transmitter side, time delay compensation is not introduced until after digital bandwidth compression taxes places by a suitable encoding algorithm (e.g. adaptive pulse code modulation, adaptive differential pulse code modulation, block companded pulse code modulation, etc.). On the receiver side, similar required time delay compensation associated with the inverse QMF filter tree may be effected prior to the decoding step. (If desired, the total desired subband delay for any given channel may be effected totally at the transmitter side or totally at the receiver side or divided therebetween in any desired fashion.)

In the exemplary embodiment, there is an approximately 4.7:1 ratio between the number of bits per second passing through the system before encoding and after encoding. Accordingly, performing the required time delay compensation at points in the system where the signals are compressed to minimum bit rates can significantly minimize the digital memory required for implementing such time delays. In the exemplary embodiment, the conventionally required RAM (for implementing delay compensation as calculated in the Zinser paper) is 49 sixteen bit words whereas, using my invention, only 5 sixteen bit words of RAM are required.

The present invention is directed to a technique for efficient implementation of delay equalization in a subband coder/decoder (e.g. a multi-band data compression waveform encoder/decoder). It permits particularly efficient implementation (in terms of minimum digital memory requirements) of speech bandwidth compression algorithms. It may also, of course, be used to efficiently implement more generalized waveform encoder/decoder algorithms where digital signals are bandwidth compressed so as to require the transmission of fewer bits per second at some points in the system.

In particular, this invention provides efficient realization of delay equalization for filter elements (or for that matter any other elements) so as to bring the processed signal within the discrete subbands back into time synchronism with respect to one another before they are multiplexed and transmitted over a common communication channel and/or at least before they are decoded and recombined in proper time synchronism (i.e. "in phase"). Since some presently available DSPs (Digital Signal Processors) have only limited on-chip digital memory capacity, the more efficient time delay compensation technique of the present invention may permit all of the required signal processing functions to be implemented on a single DSP integrated circuit chip.

These as well as other advantages, objects and features of the invention will be better appreciated by careful study of the following detailed description of the presently preferred exemplary embodiment of this invention in conjunction with the accompanying drawings, of which:

Figure 1:
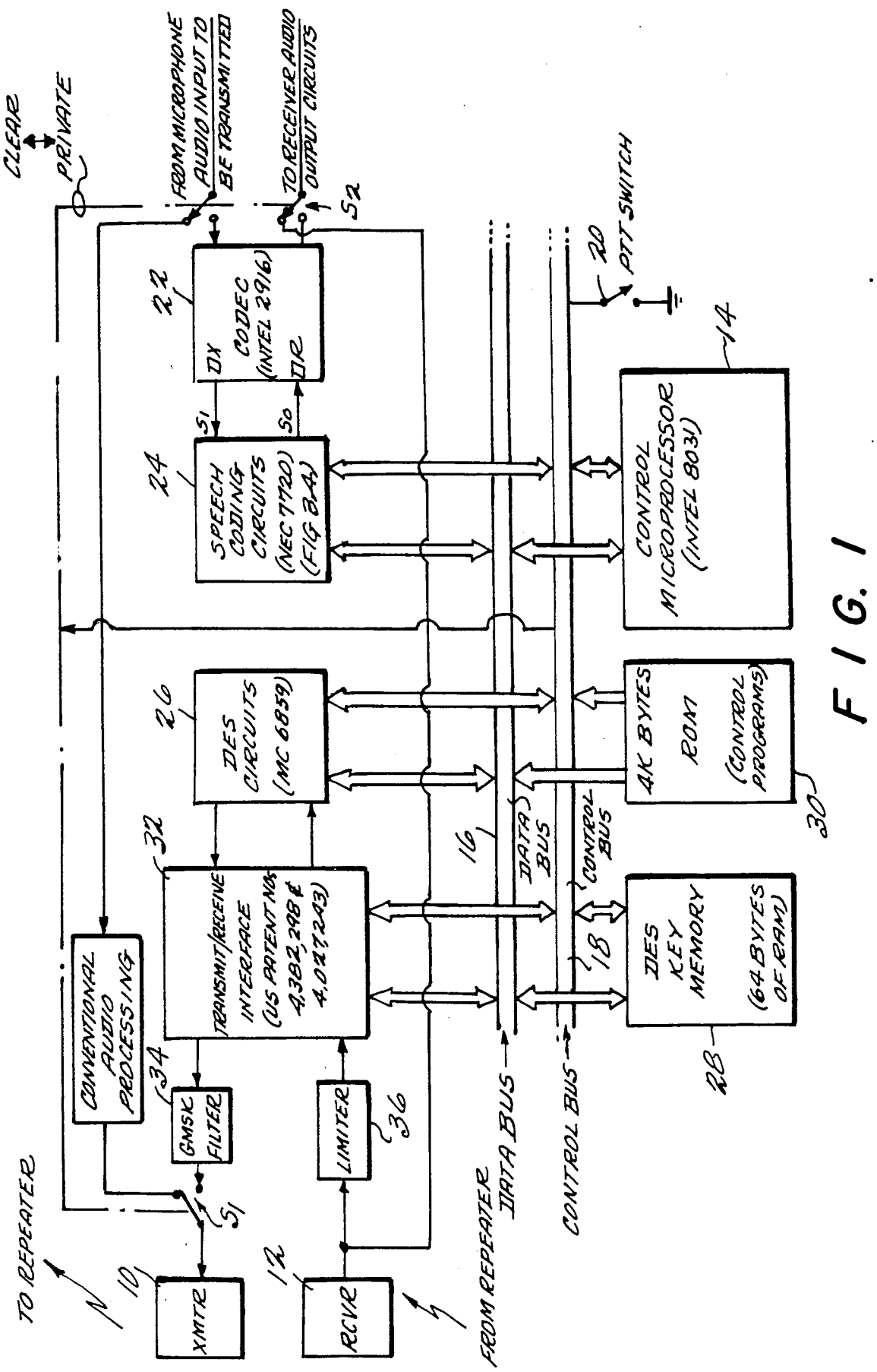
FIG. 1 is a schematic block diagram of the hardware and overall hardware architecture which may be utilized to implement this invention.

The transceiver of FIG. 1 includes the usual radio frequency transmitter 10 and radio frequency receiver 12. As indicated in FIG. 1, the transceiver may be in communication with one or more repeaters or other transceivers or base stations over a radio frequency or other (e.g. wire lines terminated with modems) communication channel. The clear/private switches S1, S2 may be provided so that the transceiver can operate in a conventional "clear" mode as well as a cryptographic or "private" mode. For example, when the switches are in the "clear" mode, as shown in FIG. 1, the audio input coming from a microphone and to be transmitted is simply directly connected to transmitter 10 while the output of receiver 12 is directly connected to the usual receiver audio output circuit as well as the privacy circuit so as to allow a coded signal to be received at any time.

However, when switches S1, S2 are moved to the "private" mode position, then the microprocessor controlled remainder of the FIG. 1 circuitry is switched into operation between the usual receiver audio input/output circuits and the usual radio frequency transmitter/receiver circuits 10, 12. In particular, for transmit functions, the microprocessor controlled circuitry will take conventional audio input signals (e.g. from a microphone or audio amplifier or the like) and convert those to a stream of cryptographically encoded digital signals input at switch S1 to the modulator of transmitter 10. On the receiving side, a stream of digital signals arise via the detector output of receiver 12 and is ultimately decoded and converted into analog audio signals at the lower contact of switch S2 before being passed on to the usual receiver audio output circuits (e.g. audio amplifiers, loudspeakers, etc.).

The overall architecture of the microprocessor control circuit shown in FIG. 1 is generally conventional. In particular, the hardware system uses a controlled microprocessor 14 (e.g. an Intel 8031 integrated circuit chip). Communication with the remainder of the digital circuitry is via the usual data bus 16 and control bus 18. The usual push-to-talk (PTT) switch 20 may be considered as one wire in the control bus 18 if desired. The system may include a conventional Codec 22 (e.g. an Intel 2916 integrated circuit chip) and speech coding circuits 24 in the form of a suitably programmed digital signal processor (e.g. an NEC 7720 integrated circuit chip) for converting audio signals to/from digital-analog form in accordance with known speech digitization and processing algorithms.

In the preferred exemplary embodiment, a hybrid subband coding technique is employed in accordance with the invention claimed in the related Zinser application. There, an audio frequency band of 180-2900 Hz is split into four octaves with the highest frequency band 1450-2900 Hz being subject to conventional block companded pulse code modulation (BCPCM) and the lower three subbands being subject to conventional adaptive pulse code modulation (APCM) digital bandwidth compression techniques. This novel hybrid subband coding technique of Zinser together with the present efficient time delay compensation technique permits the speech coding to be carried out using but a single DSP chip 24. However, as should be understood, the use of such hybrid subband coding techniques is optional insofar as the presently claimed invention is concerned. Any type of conventional digital bandwidth compression encoding/decoding algorithms may be employed in conjunction with the present invention.

The Data Encryption Standard (DES) is implemented via conventional DES circuits 26 (e.g. an MC 6859 integrated circuit chip) and a conventional DES key memory 28 (e.g. 64 bytes of RAM). Suitable conventional ROM circuits 30 (e.g. 4 kilobytes) are also provided to physically embody the program control structure for overall organizational control of the system as indicated in FIG. 1.

The transmit/receive interface circuits 32 are sometimes referred to as "modem" circuits and may also be of conventional design. They preferably include bit restoration circuits of the type described in commonly assigned U.S. Pat. No. 4,382,298—Evans. Although any conventional circuits may be used in the receive/transmit interface, the presently preferred embodiment may employ the clock recovery circuits described in the commonly owned copending Evans application Ser. No. 527,471 filed Aug. 29, 1983 and/or the up/down counter circuits described in the copending commonly assigned Evans application Ser. No. 527,470 filed Aug. 29, 1983. Reference may also be had to the commonly assigned U.S. Pat. No. 4,027,243—Stackhouse et al for digital transmit/receive modem interface circuits suitable for use with radio frequency transmitters and receivers such as transmitter 10 and receiver 12 and for a hardwired Barker code sync word detector. In the preferred exemplary embodiment, the interface 32 may be placed in a "sync search" mode whereupon such a Barker code sync word detector is activated and which thereupon outputs a priority interrupt signal to control microprocessor 14 whenever such a sync word is detected.

The data format used in the preferred embodiment is set forth in the above-referenced related Szczutkowski et al application; however, it need not be used to practice the presently claimed invention. Any conventional data format may be used.

A conventional Gaussian Minimum Shift Key filter 34 (e.g. a fourth order low pass Bessel filter having an about 5 KHz cutoff measured at the 3dB points) is preferably included to process the stream of digital output signals before they are passed on to the modulator of transmitter 10 as should be appreciated by those in the art.

The output of receiver 12 (e.g. from an FM discriminator) is also preferably passed through a conventional limiter circuit 36 to eliminate DC bias effects that otherwise might be present in the output of the receiver discriminator. For example, the limiter 36 may utilize a simple comparator to compare the instantaneous incoming signal from receiver 12 with a running averaged value over some previous relatively short interval as should also be appreciated by those in the art.

The transmit/receive interface 32 may, for example, on the transmit side comprise a conventional parallel-to-serial shift register for generating a serial stream of digital binary signals to be transmitted. On the receive side, the transmit/receive interface 32 may typically utilize a digital phase locked loop for achieving bit synchronization and a hardwired correlator for recognizing a predetermined Barker code or the like which may be used for achieving word or frame synchronization.

Those skilled in the art will understand that modern digital signal processing circuits are now available which may be appropriately programmed (e.g. microcoded) so as to implement desired filtering and time delay functions as well as encoding/decoding algorithms (e.g., APCM/ADPCM/BCPCM), multiplexing, demultiplexing, etc. functions. Indeed, in the presently preferred exemplary embodiment, an NEC 7720 digital signal processor (DSP) 24 in FIG. 1 is so programmed. However, to better understand the functional significance of the various digital signal processing steps and to thus facilitate their implementation through proper programming of the DSP, it is common to utilize functional block diagrams of the type depicted in FIGS. 2-4. Once the necessary functions have thus been defined in functional block diagram form, those skilled in this art will readily understand how to program an appropriate digital signal processor (DSP) to implement those functions which, within any given block, are merely conventional and well known digital signal processing functions.

Figure 2:
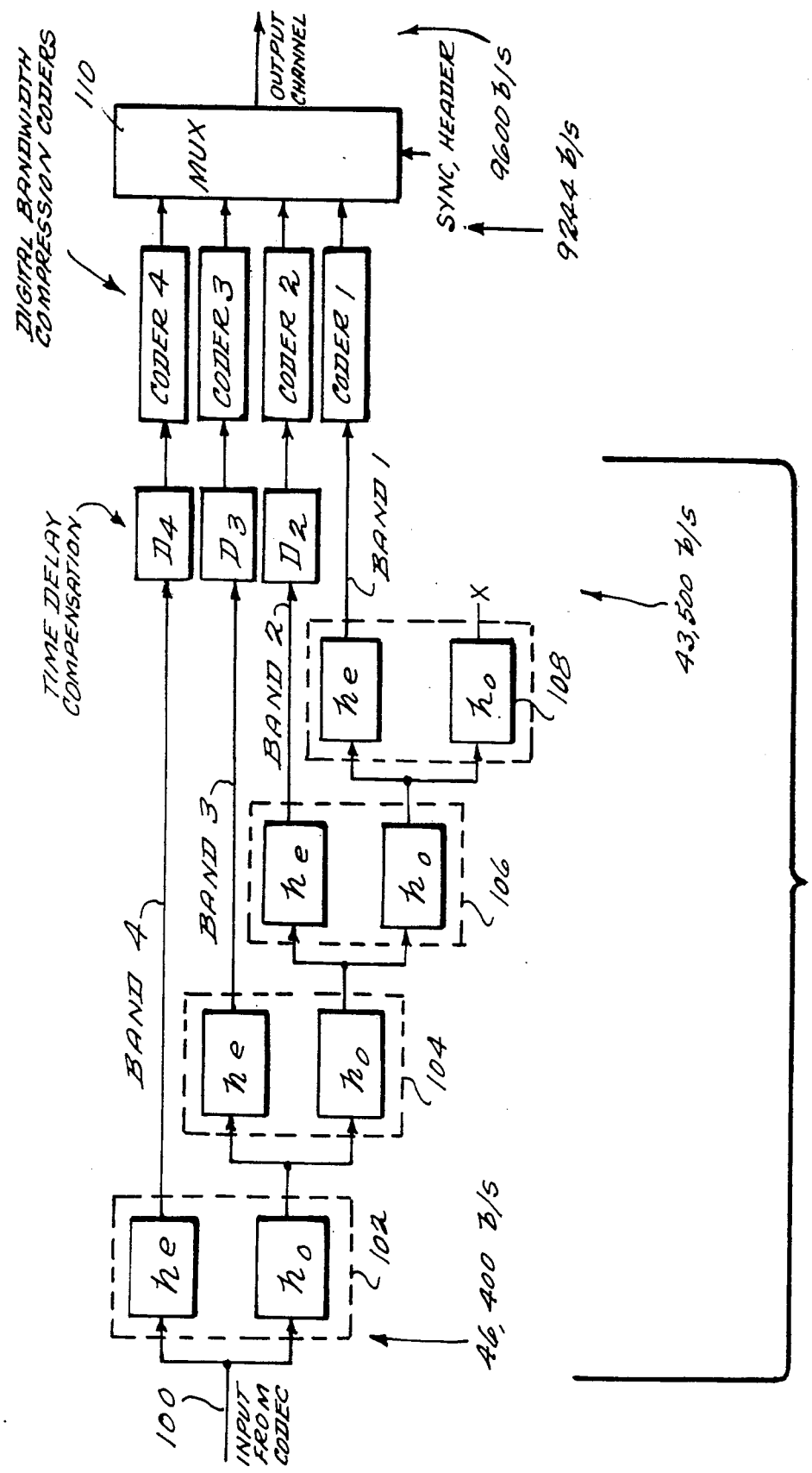
FIG. 2 is a functional block diagram of a typical prior art time delay compensation process.

As noted above, a number of subband coder/decoder implementations using programmed digital signal processors have already been discussed in the prior art. However, those which use a non-symmetrical QMF tree structure appear to always provide time delay compensation directly time-adjacent to the QMF functions as depicted in FIG. 2. Here, a time-sampled input signal at 100 is divided into multiple subband digital signals on bands 1, 2, 3 and 4 where the digital signals at each band represent a particular frequency band of the original signal. Thus, the frequency spectrum of the original input waveform (e.g. an analog audio signal input to Codec 22 giving rise to a digitized serial bit stream at input 100) is divided into four subbands using four conventional quadrature mirror filter pairs 102, 104, 106 and 108. A simplified depiction of the QMF filter pair functions is provided in FIG. 2 since they are already well known in the art.

In accordance with prior art techniques, each subband channel of digital signals is encoded using some technique which provides bandwidth reduction. For example, adaptive differential pulse code modulation (ADPCM) or simply adaptive pulse code modulation (APCM) or block companded pulse code modulation (BCPCM), etc. Digital bandwidth compression coders 1-4 are depicted in FIG. 2 as processing the respective subband channels 1-4 before the compressed digital signals are multiplexed (e.g. buffered and packed in a given sequence) at 110 to provide a bit serial string of digital signals representing discrete time segments of the original waveform. As schematically indicated at FIG. 2, appropriate synchronization and other header or "overhead" bits are typically also multiplexed into and passed over the output channel.

Superimposed on FIG. 2 are typical representative bit rates that may be involved at different points in the circuit. For example, there might be on the order of 46,400 bits per second present at the input 100 while the combined QMF filter outputs on all four subbands may equal approximately 43,500 bits per second. It will be noted that a significant 4.7:1 reduction in the bit rate occurs after the coders where four subband channels now comprise a total of 9,244 bits per second. Once additional sync and header bits and the like are added, the output channel may typically comprise 9,600 bits per second.

In any event, it will be noted that if time delay compensation is effected before bandwidth compression, significantly more bits will have to be stored over the desired time delay so as to achieve that desired time delay compensation in the various subband channels.

Figure 3:
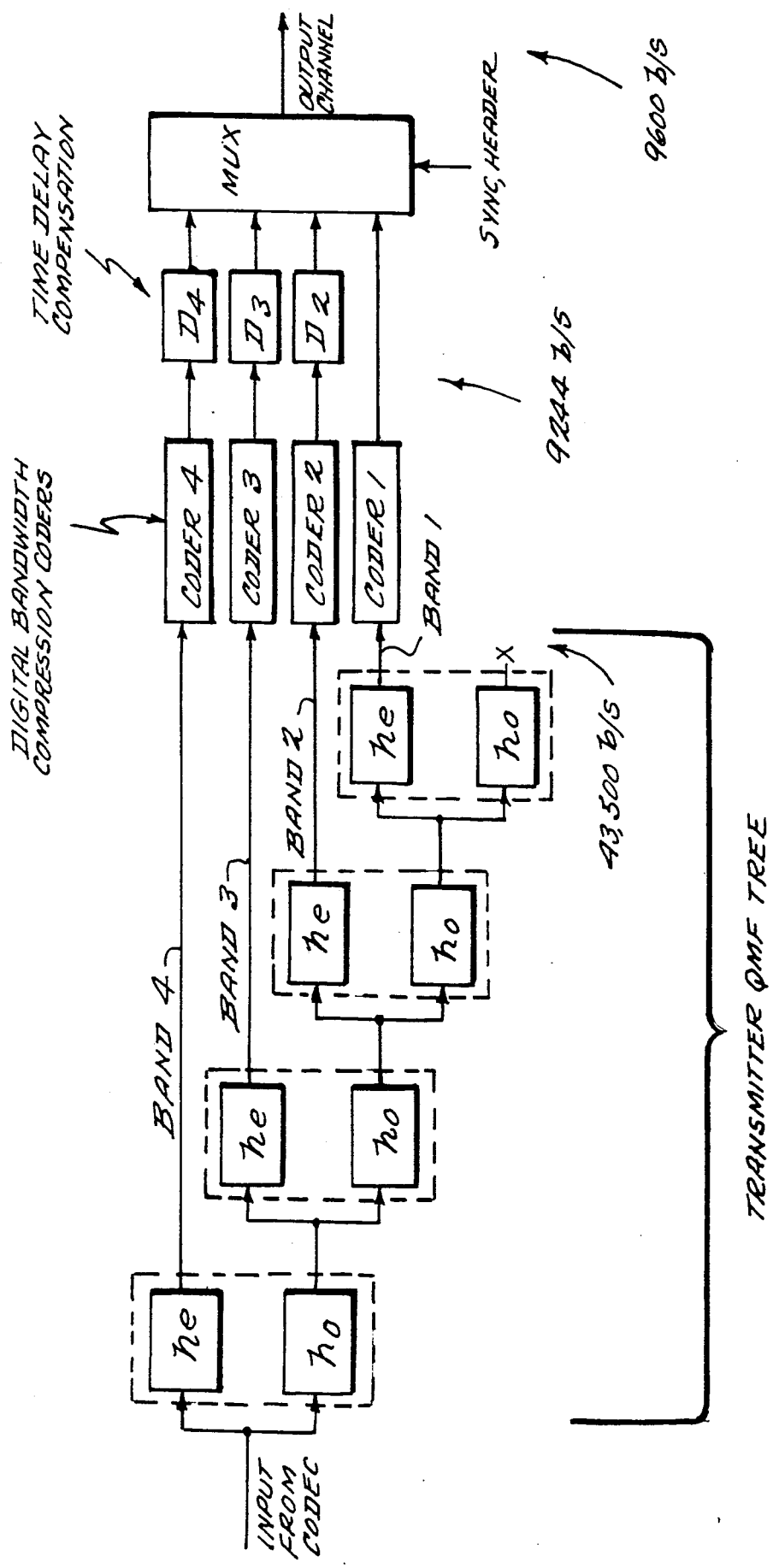
FIG. 3 is a functional block diagram of a time delay compensation process in a subband transmitter encoder in accordance with this invention.

On the other hand, if time delay compensation is provided after digital bandwidth compression by coders 2-4 (no time delay compensation is actually needed in subband 1 as it is already delayed more than the other subbands due to the extra filtering functions therein) as depicted in FIG. 3, then significantly fewer bits need be stored for the requisite time delays. In particular, in the exemplary embodiment, an improvement of approximately 10.4:1 in memory requirements can be obtained by performing time delay compensation on the digitally bandwidth compressed information flow rather than otherwise (as was conventional and as depicted in FIG. 2). For example, using Zinser's formula for calculating required subband delays, conventional practice in the exemplary embodiment would typically require use of $33+13+3=49$ sixteen bit words of RAM on the DSP integrated circuit chip. However the present invention requires only $[33(21/16)+13(2)+3(2)]/16=4.7$ sixteen bit words of RAM to realize the same needed time delays. This is a most significant 10.4 to 1 reduction in on-chip DSP delay memory requirements which can then be advantageously employed for other needed DSP functions.

For proper reconstruction of the original signal at the receiver (see functional diagram of FIG. 4), it is imperative that the various subband signals arrive at their respective decoders 1-4 in proper time synchronism with respect to one another.

Figure 4:
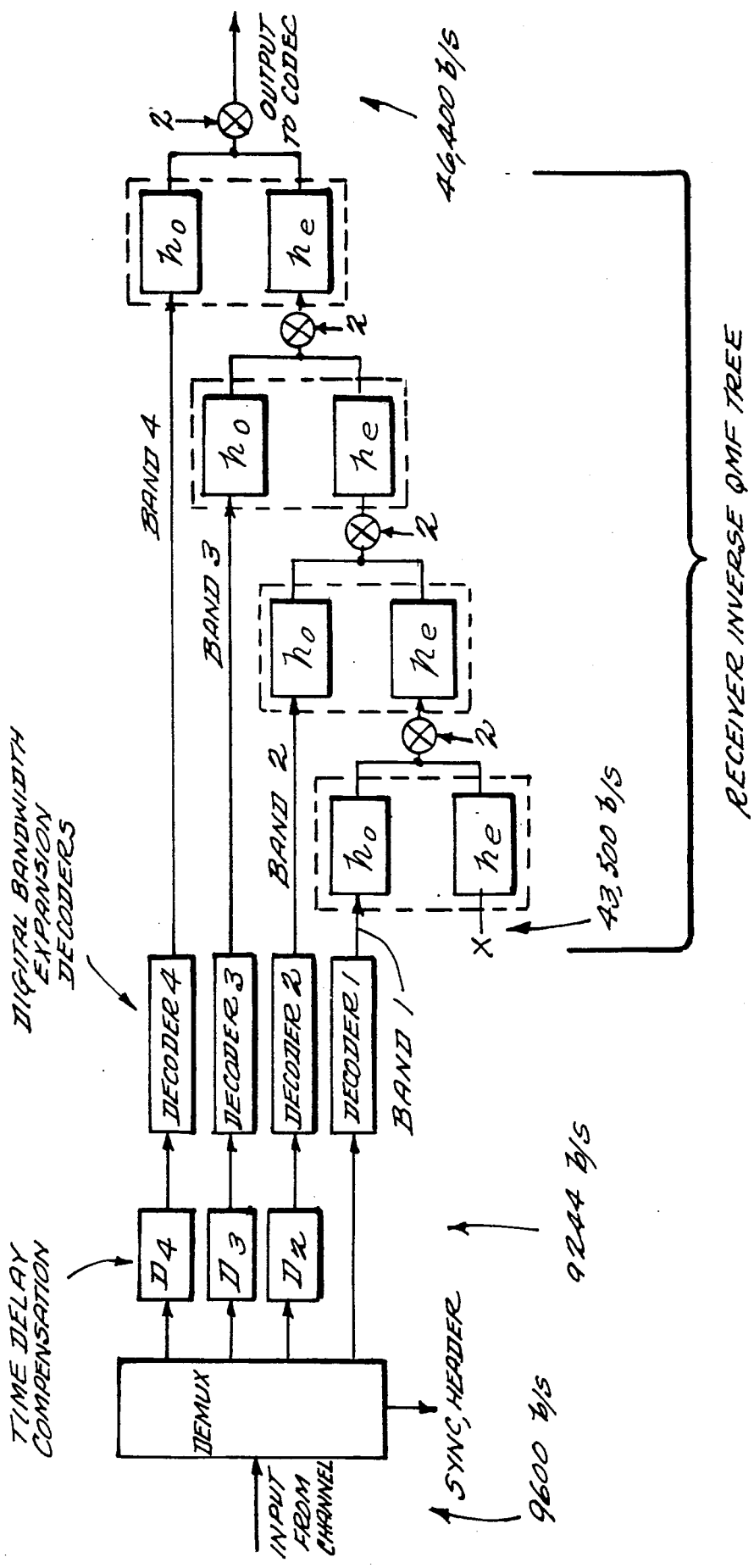
FIG. 4 is a functional block diagram of a time delay compensation process for a subband receiver decoder in accordance with this invention.

In a straightforward elementary implementation of subband coding, simple bandpass filters of the same order (e.g. each introducing the same number of delay stages) may be used in a symmetrical fashion such that all the subband signals remain in time synchronism. This implementation is however cumbersome and inefficient for real time signal processing. A much more efficient approach utilizes the efficient polyphase structures for implementing band splitting quadrature mirror filter trees as shown in FIGS. 2-4. Here, the band splitting function as well as decimation (by virtue of alternate sampling of the filter inputs between the $h_e$, $h_o$ sections) is simultaneously obtained. The implementation is computationally more efficient but unless compensating time delays are introduced into the various subband channels having lesser numbers of filtering steps, then the signals in the various subbands will not be time synchronous. The number of delay stages required will depend on the order of the filters but typically 50 or more delay stages may be required for a four subband coder implementation. If time delay compensation is achieved as in the prior art FIG. 2 manner at a point where the signals have not yet been bandwidth compressed to any great degree, a relatively large number of bits must be stored for the requisite time delays (e.g. 50×16=800 for a 16 bit architecture).

However, using this invention as depicted in FIG. 3, the digital storage required for implementing the time delay compensation is significantly reduced. This is accomplished by performing time delay compensation only after significant digital bandwidth compression has already occurred thus permitting the data to be more efficiently packed into the discrete word lengths of digital memory available in the DSP (or other specialized hardware, if desired). The coders 1-4 provide bandwidth reduction by virtue of simply reducing the number of bits used to represent each sample of the original input signal. These reduced numbers of bits can then be shifted into RAM storage on conventional DSP integrated circuits and thus tightly packed so as to effect a large savings in the memory required for delay equalization.

Although the required time delay compensation might be accomplished entirely during the transmitter functions as depicted in FIG. 3, it might also, or alternatively, be wholly or partially accomplished during implementation of the receiver functions as indicated in FIG. 4. For example, as depicted in FIG. 4, the time delay compensation is again achieved at a point in the signal processing functions where relatively fewer numbers of bits need be stored to effect the desired time delay compensation. In particular, time delay compensation is effected somewhere between the coders 1-4 of the transmitter shown in FIG. 3 and the decoders 1-4 of the receiver shown in FIG. 4.

As should be appreciated, the reconstructed digital output signal stream may be in either bit-serial or bit-parallel (i.e. byte) format as may be required for input to codec 22.

Although only one exemplary embodiment of this invention has been described in detail, those skilled in the art will recognize that many modifications and variations may be made in this exemplary embodiment while yet retaining many of the novel advantages and features of this invention. Accordingly, all such modifications and variations are intended to be included within the scope of the appended claims.

What is claimed is:

1. A digital time delay compensated subband signal processor comprising:

filter means for separating a digitized input signal into plural subband channels of digital signals having different respective time delays therein and representing corresponding subbands of signal frequency components;

digital coding means connected to said plural subband channels for separately coding the digital signals in each subband channel in a digitally compressed form to provide compressed coded digital signals in each of said subband channels;

time delay compensation means connected to at least one of said subband channels for time delaying said compressed coded digital signals in said at least one subband channel for a predetermined time period to provide substantially time synchronous coded compressed digital signals at a predetermined point in each of said subband channels; and multiplex means connected to said plural subband channels for combining said substantially time synchronous coded compressed digital signals into an output stream of coded compressed digital signals.

2. A digital time delay compensated subband signal processor as in claim 1 further comprising:

demultiplexing means connected to receive said output stream for separating a received bit-serial input stream of said coded compressed digital signals into plural received subband channels of received digital signals;

second time delay compensation means connected to at least one of said received subband channels for time delaying said received digital signals in said at least one received subband channel by a predetermined time period;

decoding means connected to said plural subband channels for separately decoding the received time-delayed digital signals in each received subband channel to provide an expanded set of digital signals therein; and inverse filter means connected to receive said expanded set of received digital signals for combining said expanded digital signals from each received subband channel with differing respective time delays which, in combination with the time delays introduced by said second time delay compensation means produces a time synchronous output stream of decoded expanded digital signals.

3. A digital time delay compensated signal processor comprising:

demultiplexing means for separating a received bit-serial input stream of coded compressed digital signals into plural received subband channels of received digital signals;

time delay compensation means connected to receive the received digital signals in at least one of said received subband channels for time delaying said received digital signals in said at least one received subband channel by a predetermined time period;

decoding means connected to said received subband channels for separately decoding the received time-delayed digital signals to provide an expanded set of digital signals therein; and inverse quadrature mirror filter means connected to receive said expanded set of digital signals for combining said expanded digital signals from each received subband channel with differing respective time delays to produce a time synchronous output stream of decoded expanded digital signals.

4. A digital time delay compensated subband signal processing method comprising:

separating a digitized input signal into plural subband channels of digital signals having different respective time delays therein and representing corresponding subbands of signal frequency components;

separately coding the digital signals in each subband channel in a digitally compressed form to provide compressed coded digital signals in each of said subband channels;

time delaying said compressed coded digital signals in at least one of said subband channels for a predetermined time period to provide substantially time synchronous digital signals in each of said subband channels; and combining said substantially time synchronous digital signals into an output stream of coded compressed digital signals.

5. A digital time delay compensated subband signal processing method as in claim 4 further comprising:

separating a received bit-serial input stream of said coded compressed digital signals into plural received subband channels of received digital signals;

time delaying said received digital signals in at least one of said received subband channels by a predetermined time period;

separately decoding the received time-delayed digital signals in each received subband channel to provide an expanded set of digital signals therein; and combining said expanded received digital signals from each received subband channel with differing respective time delays which, in combination with the time delays introduced by said second time delay compensation means produces a time synchronous output stream of decoded expanded digital signals.

6. A digital time delay compensated signal processing method comprising:

separating a received bit-serial input stream of coded compressed digital signals into plural received subband channels of received digital signals, said subband channels each time delaying said digital signals;

further time delaying said received digital signals in at least one of said received subband channels by a predetermined time delay compensation period;

separately decoding the received time-delayed digital signals to provide an expanded set of digital signals in said at least one subband channel; and combining said expanded received digital signals from each received subband channel with differing respective time delays to produce a time synchronous output stream of decoded expanded digital signals.

7. A digital time delay compensated digital processor using non-symmetrical quadrature mirror filter technique, said processor including:

means for defining plural subband channels of digital signals which are coded into a bit-compressed digital format for transmission over a communication channel; and time delay compensation means operating in said subband channels for time delaying said coded bit-compressed digital signals, for compensating for unequal time delays encountered in said non-symmetrical quadrature mirror filter technique and for minimizing digital memory requirements for effecting such time delay compensation.

8. A digital time delay compensated signal processing method including the following steps:

using a non-symmetrical quadrature mirror filter technique to define plural subband channels of digital signals which are coded into a bit-compressed digital format for transmission over a communication channel; and time delaying said coded bit-compressed digital signals in said subband channels and compensating for unequal time delays encountered in said non-symmetrical quadrature mirror filter technique while also minimizing digital memory requirements for effecting such time delay compensation.

9. A digital time delay compensated subband signal processor as in claim 1 wherein said filter means comprises a quadrature mirror filter.

10. A digital signal subband processing system including:

means for separating a digitized input signal into first and second subband channels of digital signals encoded into bit-compressed digital format, said first and second subband channels having different respective time delays therein; and time delay compensation mean operating in said first subband channel fur further time delaying said first subband coded bit-compressed digital signals by a predetermined compensation delay time period so as to substantially time synchronize said first and second coded bit-compressed subband digital signals.

11. A system as in claim 10 further including multiplexing means connected to receive said first and second subband channel digital signals for combining said substantially time synchronous digital signals into an output stream of coded compressed digital signals.

12. In a digital signal processing system providing time delay in a channel transmitting digital signals encoded into a bit-compressed digital format, the improvement comprising:

subband filter means connected to said channel for providing bit-compressed digital subband signals; and time delay compensation means operating in said channel and connected to said subband filter means for further time delaying said received bit-compressed digital signals by a predetermined compensation delay time period and for time synchronizing said bit-compressed digital signals with further subband digital signals also encoded in a bit-compressed digital format, said time delay compensation means including a digital signal storage device.

13. A digital signal subband processing system including:

filter means for separating a digitized input signal into first and second subbands of digital signals encoded into bit-compressed digital format, said first and second subbands having different inherent respective signal propagation time delays; and time delay compensation means connected to receive said first subband digital signals for further time delaying said first subband bit-compressed digital signals by a predetermined compensation delay time period so as to equalize the time delays of said first and second bit-compressed subband digital signals.

* * * * *